US012048062B2

(12) United States Patent
Schmitt et al.

(10) Patent No.: US 12,048,062 B2
(45) Date of Patent: Jul. 23, 2024

(54) SERVICE DISCOVERY MECHANISM FOR eSIM ENTITLEMENT CONFIGURATION SERVICES

(71) Applicant: Deutsche Telekom AG, Bonn (DE)

(72) Inventors: Florian-Leon Schmitt, Bonn (DE); Daniel Steinke, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/546,432

(22) PCT Filed: Feb. 11, 2022

(86) PCT No.: PCT/EP2022/053359
§ 371 (c)(1),
(2) Date: Aug. 15, 2023

(87) PCT Pub. No.: WO2022/175176
PCT Pub. Date: Aug. 25, 2022

(65) Prior Publication Data
US 2024/0040365 A1    Feb. 1, 2024

(30) Foreign Application Priority Data

Feb. 16, 2021   (EP) ..................................... 21157481

(51) Int. Cl.
*H04W 8/18*     (2009.01)
*H04W 48/16*    (2009.01)
(52) U.S. Cl.
CPC ........... *H04W 8/183* (2013.01); *H04W 48/16* (2013.01)
(58) Field of Classification Search
CPC ............................. H04W 8/183; H04W 48/16
See application file for complete search history.

(56) References Cited

U.S. PATENT DOCUMENTS

2020/0021973 A1   1/2020  Anslot et al.
2020/0260241 A1*  8/2020  Sicard .................. H04W 8/245
(Continued)

OTHER PUBLICATIONS

CSMG "Reprogrammable SIMs: Technology, Evolution and Implications Final Report", Sep. 25, 2012 (Sep. 25, 2012), pp. 1-95, XP055126567, London, United Kingdom, Retrieved from the Internet: URL:http://stakeholders.ofcom.org.uk/binaries/research/telecoms-research/reprogrammable-sims.pdf [retrieved on Jul, 2, 2914], paragraph [0005]—paragraph [0007].

*Primary Examiner* — Diane D Mizrahi
(74) *Attorney, Agent, or Firm* — LEYDIG, VOIT & MAYER, LTD.

(57) ABSTRACT

A service discovery method for activating an embedded subscriber identity module (eSIM) device includes: initiating a device comprising an eSIM; and connecting the device to at least one of an entry point of a mobile network operator and a designated entitlement configuration server, using an entitlement configuration for automatically activating the eSIM via the connection to the entitlement configuration server and connecting the eSIM with a data service or a data network of the mobile network operator based on an entitlement of designated use-cases. The device and the entitlement configuration server validate parameters and/or methodologies for the entitlement configuration. The device requests the entitlement configuration server to provide supported parameters for a designated use-case and compares the response returned by the entitlement configuration server with its own supported parameters for the designated use-case.

15 Claims, 1 Drawing Sheet

(56) References Cited

U.S. PATENT DOCUMENTS

2020/0351656 A1 11/2020 Johansson et al.
2023/0073252 A1* 3/2023 Chaugule .............. H04W 12/42

* cited by examiner

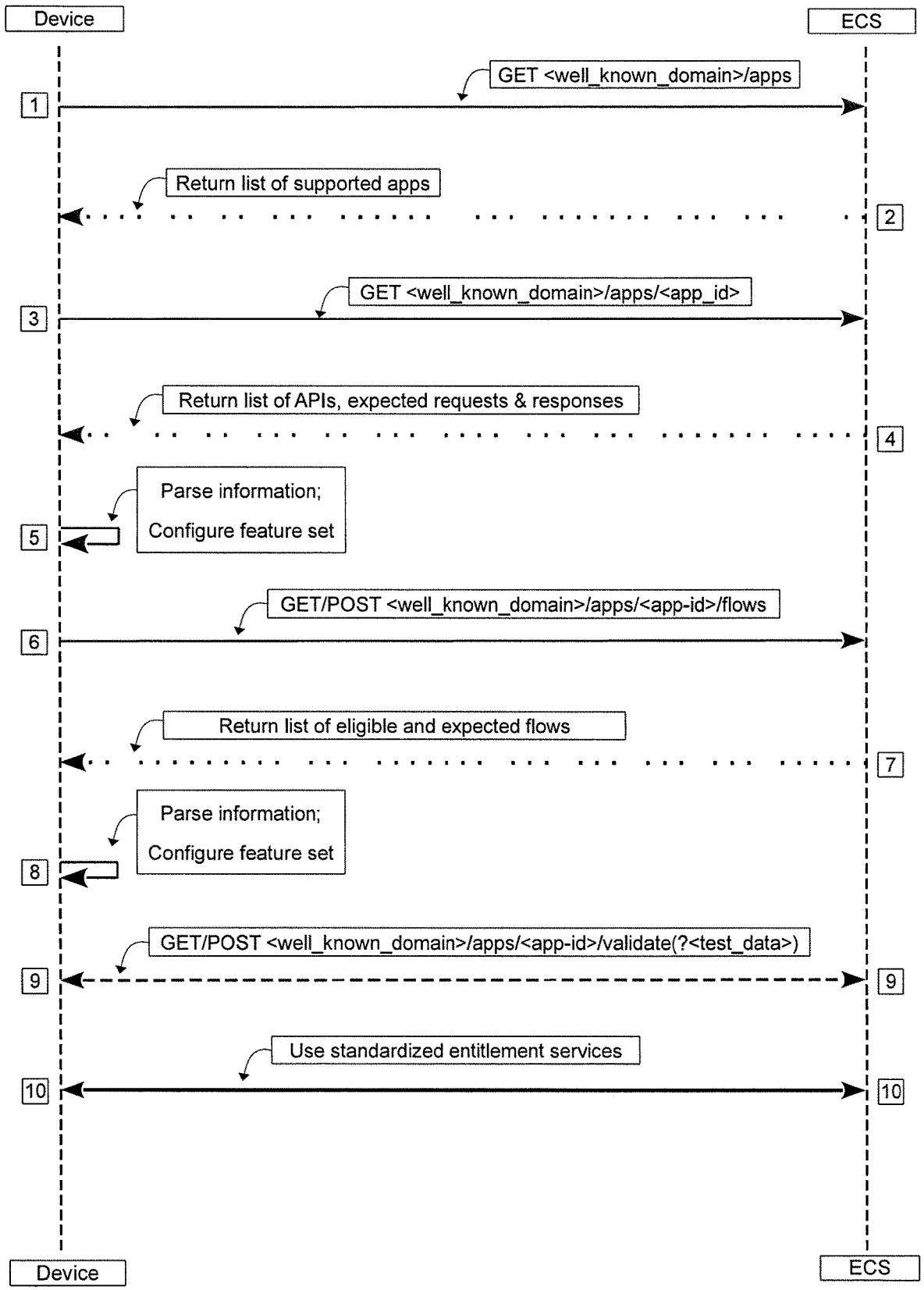

SERVICE DISCOVERY MECHANISM FOR eSIM ENTITLEMENT CONFIGURATION SERVICES

CROSS-REFERENCE TO PRIOR APPLICATIONS

This application is a U.S. National Phase application under 35 U.S.C. § 371 of International Application No. PCT/EP2022/053359, filed on Feb. 11, 2022, and claims benefit to European Patent Application No. EP 21157481.9, filed on Feb. 16, 2021. The International Application was published in English on Aug. 25, 2022 as WO 2022/175176 A1 under PCT Article 21(2).

FIELD

This application relates to a service discovery method for activating an embedded subscriber identity module (eSIM) device comprising: Initiating at least one device comprising an eSIM; connecting the device to at least one of an entry point of a Mobile Network Operator and a designated entitlement configuration server, using an entitlement configuration for automatically activating the eSIM via the connection to the entitlement configuration server and connecting the eSIM with a data service or a data network of the Mobile Network Operator based on the entitlement of designated use-cases. The application further relates to a system for an eSIM entitlement, comprising at least one device with an eSIM, at least one entry point of a data service or a data network of a Mobile Network Operator and a designated entitlement configuration server connected to the entry point.

BACKGROUND eSIM's respective devices provided with an eSIM are becoming more popular, and are expected to gain a lot more traction in the next years. Multiple industry groups, such as 3gpp and GSMA are therefore working on standardized technologies, to enable the development of a well working, interoperable industry environment. In GSMAs Terminal Steering Group (GMSA-TSG), the work item "TS.43 Service Entitlement" deals with standardized methods, procedures and protocols, to enable eSIM entitlement use-cases. The most important use-cases in these regards are on-device service activation (ODSA) for primary and secondary devices, as well as subscription transfer for primary and/or secondary devices.

TS.43 is essential for the industry's eSIM development, as it standardizes the processes which are needed to enable the user equipment to receive and handle eSIM subscriptions. As TS.43 is gaining more and more interest from multiple Original Equipment Manufacturers (OEM) and operators, it also includes more and more options on how a possible setup of an entitlement server can be implemented.

For the future, this means that every operator has to talk to every OEM in order to align on a way of implementation for their specific network. This will encourage a big disadvantage for smaller operators and OEMs. It also increases complexity and cost, as eSIM gets more traction and TS.43 evolves further.

The patent application US 2020/260241 A1 discloses a possible setup of systems that deal with eSIM provisioning. The idea presented in this invention is making use of the technology provided by the standardized methods, procedures and protocols of TS.43. The patent application defines the general technology, but leaves out the possibility that there are numerous of possible ways to set up an entitlement infrastructure. As the networks of Mobile Network Operators (MNO) differ as well as device capabilities, it's not possible to take the shown technology as a 'one fits all' solution.

SUMMARY

In an exemplary embodiment, the present invention provides a service discovery method for activating an embedded subscriber identity module (eSIM) device. The method includes: initiating a device comprising an eSIM; and connecting the device to at least one of an entry point of a mobile network operator and a designated entitlement configuration server, using an entitlement configuration for automatically activating the eSIM via the connection to the entitlement configuration server and connecting the eSIM with a data service or a data network of the mobile network operator based on an entitlement of designated use-cases. The device and the entitlement configuration server validate parameters and/or methodologies for the entitlement configuration. The device requests the entitlement configuration server to provide supported parameters for a designated use-case and compares the response returned by the entitlement configuration server with its own supported parameters for the designated use-case.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 is a communication diagram depicting entitlement steps of a 'service discovery mechanism' according to an exemplary embodiment of the disclosure.

DETAILED DESCRIPTION

Exemplary embodiments of the present invention provide a standardized solution for an entitlement infrastructure for activating an eSIM device, like a cell phone. This application incorporates the standardized methods, procedures, protocols and parameters of each entitlement verification step disclosed in the TS.43. Further this application makes use of the definitions of its items and terms.

According to a method according to an exemplary embodiment of the present invention, a device and an entitlement configuration server (ECS) validate parameters and/or methodologies for an entitlement configuration. In the sense of the application, to validate means a process of evaluating the interfaces and methods to determine whether they satisfy specified requirements of the entitlement case. Due to that the device asking for entitlement and the network enabling entitlement can agree on a set of parameters and/or methodologies on how to proceed with the entitlement configuration.

Thus the solution is to establish a 'service discovery mechanism': A device, which requests service entitlement from a network, can indicate that it supports a specific kind of entitlement configuration (e.g. TS.43). The network can also indicate that it supports TS.43 entitlement.

By defining a specific set of implementation possibilities, the device and the network can easily arrange on a preferred mode of service entitlement. Some examples for different ways of implementation are profile-delivery in case of delayed delivery, polling/pushing behavior, support of specific protocols or services.

Before entering in any entitlement procedure with the network, a device would enter a 'service discovery procedure' with the network/ECS. In this procedure the device would list all its different capabilities regarding service entitlement. The network/ECS may then send back the configuration it wants to proceed with. This can easily be implemented using a REST, SOAP, or similar interface. Device and network then know how to act and react in all the different entitlement procedures.

As there is currently no 'service discovery mechanism', eSIM entitlement procedures only work for a few large OEMs with a handful of MNOs. A 'service discovery mechanism' therefore would enable open market devices to use entitlement configuration services in every network supporting the same service discovery mechanism.

The deployment of eSIM devices in the field is rising, and expected to rise a lot more in the future. To enable interoperability a standard like TS.43 is essential. Exemplary embodiments of the present invention, based on providing a 'service discovery mechanism' and its related system, reduce cost and complexity and enable a wider deployment.

In the following some preferred embodiments of the entitlement steps of the 'service discovery mechanism' are described in more detail, some of them are shown as arrows of successive steps levels in FIG. 1.

For starting the method of the 'service discovery mechanism' there are some prerequisites to be fulfilled. Adapting the procedure shown in TS.43, the device needs to discover the Well Known Domain Name of the ECS. E.g. the ECS serves the following resource: GET<well_known_domain>/apps. Staying in this example the ECS furthermore serves a resource per supported app: GET<well_known_domain>/apps/<app_id>.

In one preferred embodiment of the method, the device has to detect the supported use-cases. Therefore it requests the ECS to provide use-cases supported by the ECS and parses the response returned by the ECS to enable user interface elements which are required for the use-cases supported by the ECS and/or disable user interface elements for the use-cases which are not supported by the ECS. The different use-cases which can be served by an ECS are identified in TS.43 by so called "app IDs". Each app ID identifies an use-case which requires support for certain API calls, data structures and user interactions on the device side and on the ECS side.

In order to allow the device to find out which use-cases are supported by the ECS, the following mechanism is provided:

The device sends the following request: GET<well_known_domain>/apps, as shown in step level 1 of FIG. 1.

The ECS returns a list of supported apps in form of a machine readable document (e.g. JSON, YAML, XML), which is shown with the following step level 2 of FIG. 1.

Then the device can parse the received list to enable or disable user interface elements which are required or not required for the apps or use-cases contained or not contained in the list.

If a device decides to use one of the offered services or apps on the ECS, there is still some uncertainty left if the parameters required by the ECS can and will be provided by the device. Thus the required API calls and parameters have to be detected in a second step of the method. Therefore the device requests the entitlement configuration server to provide supported parameters for a designated use-case and compares the response returned by the entitlement configuration server with its own supported parameters for the designated use-case.

In order to learn which API calls and parameters are mandated by the ECS for this app id, the following preferred steps are provided:

Shown with step level 3 of FIG. 1, the device sends the following request: GET<well_known_domain>/apps/<app_id>.

It is preferred that the supported parameter for a designated use-case responded by the entitlement configuration server encloses application programming interface (API) endpoints and/or data structures provided for the designated use-case. Thus the ECS should return a machine readable document which describes the API endpoints and data structures expected in the request as well as the responses send by the ECS as shown with step level 4 of FIG. 1.

Step level 5 of FIG. 1 relates to the device only, which can parse the document and compare it with its own list of supported API calls and data elements to configure its feature set. Such a machine readable document for API description may be following OpenAPI 3 specification.

If the ECS requirements and the device capabilities are not matching, the device should disable the related functionality and/or UI elements. Therefore it is preferred that the device disables the functionality and/or user interface element of the designated use-case if a designated parameter for the designated use-case supported by the device does not match the designated parameter for the designated use-case supported by the ECS.

If a device supports all API calls required by the ECS and is able to provide all required data, a following step of the method should be to mutually validate the requests and responses. Thus it is preferred that the device determines call sequences for an automated validation of the requests and responses. It is useful to subdivide the automated validation in two intermediary steps. First the description respective detection of call sequences has to be performed. Afterwards follows the formal validation of requests and responses from the call sequence against formal interface description obtained in detection of required API calls and parameters.

The description respective detection of call sequences should be performed, because in some scenarios different kinds of implementations are permitted by the standard document, which leads to different call flows. Thus it is preferred that if a standard for eSIM entitlement permits different implementations of call sequences for the designated use-case, the device requests the entitlement configuration server to provide the implementation supported by the entitlement configuration server.

In order to learn which call flows are supported, and which device behavior is expected by the ECS, the device may send the following request: GET<well_known_domain>/apps/<app-id>/flows as shown with step level 6 of FIG. 1.

The ECS may return a machine readable document which lists the supported respective expected or eligible call flows, which is shown with step level 7 of FIG. 1. This can be done as an ordered list of references to the respective sections of the API description obtained by the device during the detection of required API calls and parameters. If the ECS responds with an HTTP error code (e.g. 404), automated validation is not supported by the ECS.

Again, the device parses the information and uses it to configure its feature set as shown with step-level 8 of FIG. 1.

In this context it is a preferred option that the supported parameter for a designated use-case responded by the ECS encloses a link to test data for a step of the call sequence and the device requests the test data from the provided link to validate the step of the call sequence. If a step from the document delivered in the step before contains a link to a set to test data, these data can be used by the device to validate this step. It is preferred that the device retrieves the test data from the provided link in a sequence or step description.

Based on the sequence description received in the first intermediary step, the device can execute the second intermediary step to mutually validate the interface between the ECS and the device. A preferred validation may follow this preferred procedure per step of every call sequence as shown with step level 9 of FIG. 1:

The device sends a validation request to the ECS to validate the supported parameters for a designated use-case. This may be the request: GET/POST<well_known_domain>/apps/<app-id>/validate (?<test_data>).

If the validation request of the device fails the validation of the ECS, an error response is returned to the device and the designated use-case is not offered to the device.

If the ECS responds an agreement to the validation of the designated use-case, the device validates its supported parameters for the designated use-case. The device may validate it either against its own expectations or against the formal description of the response received during the detection of required API calls and parameters. Now the device and the ECS are able to use the standardizes entitlement services for activating the eSIM of the device as shown with step level 10 of FIG. 1.

But in case the request from the device failed the validation of the ECS a meaningful error response should be returned which can be used for debugging. Hence the affected use-case/scenario should not be offered to the customer in this case. Thus if the validation of the supported parameters for the designated use-case received by the ECS fails, the designated use-case is not established in the device.

In case the response from the ECS fails the devices validation, the affected use-case/scenario also should not be offered by the customer.

In an optional step, the device can provide information about the failed validation to the ECS if the formal API specification contains an endpoint for collecting use-case telemetry, e.g. in the form of <well_known_domain>/apps/<app-id>/telemetry. Thus it is preferred that if a standard for eSIM entitlement contains an endpoint for collecting use-case data, the device provides information about the failed validation to the entitlement configuration server.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A service discovery method for activating an embedded subscriber identity module (eSIM) device, comprising:
   initiating a device comprising an eSIM; and
   connecting the device to at least one of an entry point of a mobile network operator or a designated entitlement configuration server, using an entitlement configuration for automatically activating the eSIM via the connection to the entitlement configuration server and/or the connection to the entry point, and connecting the eSIM with a data service or a data network of the mobile network operator based on an entitlement of designated use-cases;
   wherein the device and the entitlement configuration server validate parameters and/or methodologies for the entitlement configuration;
   wherein the device requests the entitlement configuration server to provide supported parameters for a designated use-case and compares a response returned by the entitlement configuration server with the device's supported parameters for the designated use-case.

2. The method of claim 1, wherein the device requests the entitlement configuration server to provide use-cases supported by the entitlement configuration server and parses a response returned by the entitlement configuration server to enable user interface elements which are required for use-cases supported by the entitlement configuration server and/or to disable user interface elements for use-cases which are not supported by the entitlement configuration server.

3. The method of claim 2, wherein the device determines call sequences for automated validation of the requests and responses.

4. The method of claim 3, wherein based on a standard for eSIM entitlement permitting different implementations of call sequences for the designated use-case, the device requests the entitlement configuration server to provide an implementation supported by the entitlement configuration server.

5. The method of claim 4, wherein a supported parameter for the designated use-case provided in the response from the entitlement configuration server includes a link to test data for a step of a call sequence, and the device requests the test data from the provided link to validate the step of the call sequence.

6. The method of claim 3, wherein the device and the entitlement configuration server validate an interface between the device and the entitlement configuration server.

7. The method of claim 6, wherein the device sends a validation request to the entitlement configuration server to validate the supported parameters for the designated use-case.

8. The method of claim 7, wherein based on the validation by the entitlement configuration server failing, an error response is returned to the device and the designated use-case is not offered to the device.

9. The method of claim 7, wherein based on the entitlement configuration server responding with an agreement to the validation of the designated use-case, the device validates its supported parameters for the designated use-case.

10. The method of claim 7, wherein based on the entitlement configuration server responding with an agreement to the validation of the designated use-case, the device validates the supported parameters for the designated use-case against the supported parameters for the designated use-case received by the entitlement configuration server.

11. The method of claim 7, wherein based on the validation by the entitlement configuration server failing, the designated use-case is not established in the device.

12. The method of claim 11, wherein based on a standard for eSIM entitlement containing an endpoint for collecting use-case data, the device provides information about the failed validation to the entitlement configuration server.

13. The method of claim 1, wherein the device disables a functionality and/or a user interface element of the designated use-case based on a designated parameter for the designated use-case supported by the device not matching a designated parameter for the designated use-case supported by the entitlement configuration server.

14. The method of claim 1, wherein a supported parameter for the designated use-case provided in the response from the entitlement configuration server includes application programming interface (API) endpoints and/or data structures provided for the designated use-case.

15. A system for an embedded subscriber identity module (eSIM) entitlement, comprising:
 a device with an eSIM;
 at least one entry point of a data service or a data network of a mobile network operator; and
 a designated entitlement configuration server connected to the at least one entry point,
 wherein the device, the at least one entry point, and the entitlement configuration server are configured to:
  initiate the device; and
  connect the device to at least one of the entry point or the entitlement configuration server, using an entitlement configuration for automatically activating the eSIM via the connection to the designated entitlement configuration server and/or the connection to the entry point, and connect the eSIM with the data service or the data network of the mobile network operator based on an entitlement of designated use-cases;
 wherein the device and the entitlement configuration server are configured to validate parameters and/or methodologies for the entitlement configuration;
 wherein the device is configured to request the entitlement configuration server to provide supported parameters for a designated use-case and compare a response returned by the entitlement configuration server with the device's supported parameters for the designated use-case.

* * * * *